US008253879B2

(12) United States Patent
Cho et al.

(10) Patent No.: US 8,253,879 B2
(45) Date of Patent: Aug. 28, 2012

(54) LIQUID CRYSTAL DISPLAY DEVICE

(75) Inventors: Nam-Chul Cho, Seoul (KR);
Seung-Hwan Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 356 days.

(21) Appl. No.: 12/654,588

(22) Filed: Dec. 23, 2009

(65) Prior Publication Data
US 2010/0328569 A1    Dec. 30, 2010

(30) Foreign Application Priority Data

Jun. 26, 2009    (KR) .................. 10-2009-0057972

(51) Int. Cl.
*G02F 1/1333*    (2006.01)
(52) U.S. Cl. ......................................... 349/58
(58) Field of Classification Search .................. None
See application file for complete search history.

(56) References Cited

U.S. PATENT DOCUMENTS
2009/0115928 A1*    5/2009  Shin .......................... 349/58
* cited by examiner

*Primary Examiner* — Thanh-Nhan P Nguyen
(74) *Attorney, Agent, or Firm* — McKenna Long & Aldridge LLP (57) ABSTRACT

The present invention relates to a liquid crystal display device. The liquid crystal display device includes a liquid crystal module having a top case, a bottom plate, a liquid crystal display panel in the top case and the bottom plate for displaying a picture, and a drive unit. The liquid crystal display device also includes a drive control unit for generating a control signal for controlling the drive unit and supplying the control signal to the drive unit of the liquid crystal module through at least one connector and cable. The top case of the liquid crystal module includes at least one first and second fastening bent portion for fastening at least one source printed circuit board in horizontal and vertical directions, respectively.

8 Claims, 5 Drawing Sheets

LIQUID CRYSTAL DISPLAY DEVICE

CROSS REFERENCE TO RELATED APPLICATION

This application claims the benefit of Korean Patent Application No. 10-2009-0057972, filed on Jun. 26, 2009, which is hereby incorporated by reference as if fully set forth herein.

BACKGROUND OF THE DISCLOSURE

1. Field of the Disclosure

The present invention relates to liquid crystal display devices, and more particularly, to a liquid crystal display device in which a bending structure of a top case which is an exterior of a liquid crystal module is changed for improving assembly process efficiency of the liquid crystal display device.

2. Discussion of the Related Art

Currently, as flat panel displays used in personal computers, personal digital assistants and monitors of various kinds of information instruments, liquid crystal display devices and light emitting displays are on the rise.

Of the flat panel displays, the liquid crystal display device displays a picture by controlling a light transmissivity of liquid crystals by using an electric field. To do this, the liquid crystal display device is provided with a liquid crystal module having an assembly of a liquid crystal display panel with pixel regions arranged thereon, a drive circuit for driving the liquid crystal display panel, and a back light unit for directing a light to the liquid crystal display panel.

Data integrated circuits of the drive circuit in the liquid crystal module are respectively attached to a plurality of source printed circuit boards or printed circuit films which are different from one another, and, in a case of gate integrated circuits, the gate integrated circuits are attached to one side of the liquid crystal display panel or formed on the liquid crystal display panel, directly. Thus, the liquid crystal display panel, the drive circuit, and the back light unit of the liquid crystal module are placed in a case which is an exterior of the liquid crystal module, for an example, a bottom case or a support main, and a top case.

In the meantime, control means, for an example, a timing controller or a drive system, for controlling driving of the liquid crystal module is provided to a separate control printed circuit board or the like for supplying a control signal required for the drive circuits through at least one cable or connector. In detail, the control printed circuit board having the control means provided thereto may be mounted to a back side of the liquid crystal module, for an example, to a back side of the bottom case separately, and connected to the drive circuits of the liquid crystal module through at least one cable and bidirectional connectors provided to each of the cables, electrically.

However, the failure of making easy connection of the cables and the connectors from the control printed circuit board to a related art liquid crystal module has caused poor assembly process efficiency. In detail, the related art liquid crystal module has at least one of the connectors formed at least one of the source printed circuit boards connected to the printed circuit film. And, the cables of the connectors from the control printed circuit board are fastened to the connectors at the source printed circuit boards. However, since the printed circuit film or the source printed circuit boards of the liquid crystal module are not fastened, and there is a space between the top case and the bottom case, in which the printed circuit film or the source printed circuit boards is disposed, allowing the printed circuit film or the source printed circuit boards to move, the failure of making easy connection of the cables and the connectors from the control printed circuit board to a related art liquid crystal module has caused. Consequently, there can be delay of the assembly process time, and a poor process efficiency caused by damage to the printed circuit board or fastening means of the connector or the cable.

SUMMARY OF THE DISCLOSURE

Accordingly, the present invention is directed to a liquid crystal display device.

An object of the present invention is to provide a liquid crystal display device in which a bending structure of a top case which is an exterior of a liquid crystal module is changed for improving assembly process efficiency of the liquid crystal display device.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes a liquid crystal module having a top case which forms a front side exterior of a liquid crystal module, a bottom plate which forms a back side exterior of the liquid crystal module, a liquid crystal display panel in the top case and the bottom plate for displaying a picture and a drive unit for driving gate lines and data lines in the liquid crystal display panel, and a drive control unit for generating a control signal for controlling the drive unit of the liquid crystal module and supplying the control signal to the drive unit of the liquid crystal module through at least one connector and cable, wherein the top case of the liquid crystal module includes at least one first and second fastening bent portion formed for fastening at least one source printed circuit board having at least one connector of the drive unit of the liquid crystal module attached thereto in horizontal and vertical directions, respectively.

The drive unit of the liquid crystal module includes a plurality of data integrated circuits, a plurality of data circuit films, and at least one source printed circuit board for driving data lines in the liquid crystal module, wherein the plurality of data integrated circuits are respectively mounted to the plurality of data circuit films and connected between one side of the liquid crystal display panel and the source printed circuit boards.

The drive control unit is formed on a control printed circuit board provided to a back side of the bottom plate, and the cables electrically connected through the control printed circuit board and the at least one control connector are respectively connected to the source connectors at the source printed circuit boards for supplying the control signal thereto.

The at least one fastening bent portion is vertically projected inward from the top case such that the first fastening bent portion is also vertical to the source printed circuit boards at a position opposite to the source printed circuit boards having the source connectors attached thereto respectively so that the at least one first fastening bent portion fastens the source printed circuit boards such that the source printed circuit boards can not move in a vertical direction.

The source printed circuit boards are secured such that the source printed circuit boards can not move vertically between the first fastening bent portions bent inward from the top case to be in contact thereto and a panel supporter or the bottom plate.

The at least one second fastening bent portion is projected inward from front and side direction bent portions of the top case in a direction opposite to front and side bent directions, such that the second fastening bent portion 30b is projected at a position opposite to the source printed circuit boards in a horizontal direction.

The source printed circuit boards are secured by the second fastening bent portions bent and projected in a horizontal direction and the data circuit films attached to the source printed circuit boards themselves respectively such that the source printed circuit boards can not move in the horizontal direction.

The top case includes at least one opened region at each region opposite to positions of source connectors at each of the source printed circuit boards.

The opened region has a size formed larger than a size of the source connector such that the opened region can expose the source connector of the source printed circuit board.

The at least one fastening bent portion is formed by bending the top case at the opened regions vertical to the source printed circuit boards.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
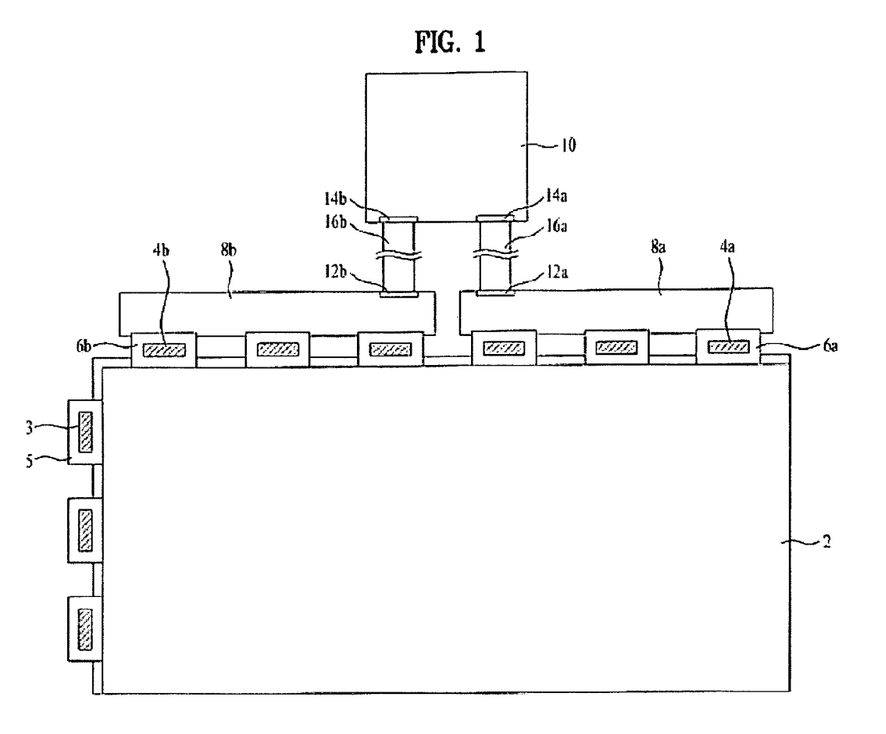
FIG. 1 illustrates a diagram of a liquid crystal module in accordance with a preferred embodiment of the present invention, schematically.
Figure 2:
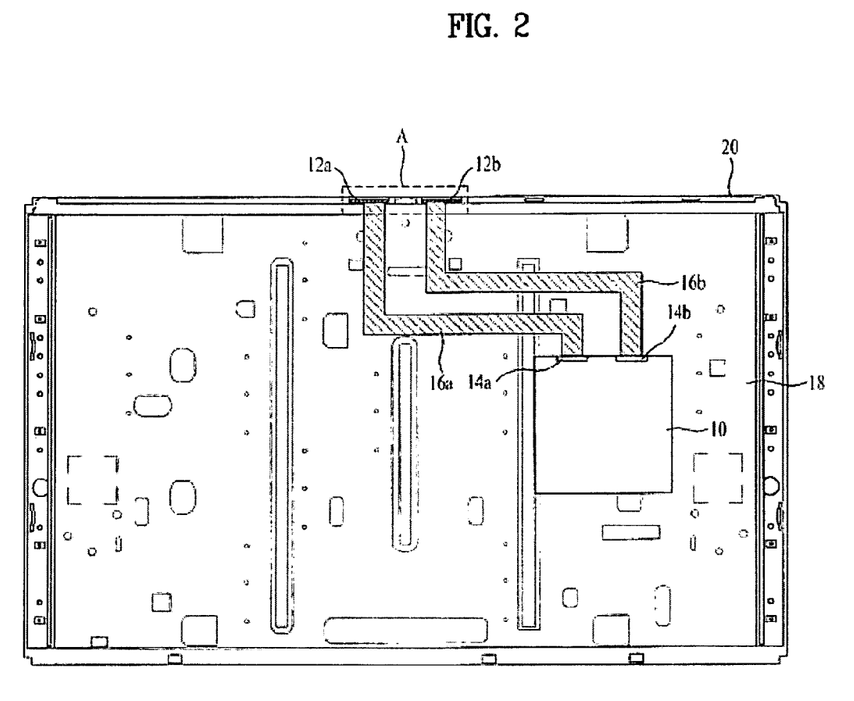
FIG. 2 illustrates a back side of a liquid crystal display device having the liquid crystal module in FIG. 1 mounted thereto.

FIG. 1 illustrates a diagram of a liquid crystal module in accordance with a preferred embodiment of the present invention schematically, and FIG. 2 illustrates a back side of a liquid crystal display device having the liquid crystal module in FIG. 1 mounted thereto.

Referring to FIGS. 1 and 2, the liquid crystal display device includes a liquid crystal module having a top case 20 which forms a front side exterior of a liquid crystal module, a bottom plate 18 which forms a back side exterior of the liquid crystal module, a liquid crystal display panel 2 in the top case 20 and the bottom plate 18 for displaying a picture and a drive unit for driving gate lines and data lines in the liquid crystal display panel, and a drive control unit 10 for generating a control signal for controlling the drive unit of the liquid crystal module and supplying the control signal to the drive unit of the liquid crystal module through at least one connector 14a and 14b and cable 16a and 16b. The top case 20 of the liquid crystal module has at least one first and second fastening bent portions for fastening source printed circuit boards 8a and 8b having connectors 12a and 12b of the drive unit attached thereto, thereby making easy connection of the at least one cable 16a and 16b or the connectors connected to the drive control unit 10 to the connectors 12a and 12b of the drive unit fastened thus.

In more detail, the liquid crystal display panel 2 includes thin film transistors TFT respectively formed at pixel regions defined by a plurality of gate lines and data lines, and liquid crystal capacitors connected to the thin film transistors respectively. The liquid crystal capacitor has a pixel electrode connected to the thin film transistor TFT, and a common electrode with the pixel electrode and the liquid crystals disposed therebetween. The thin film transistor TFT supplies a picture signal to the pixel electrode from the data line in response to a scan pulse from the gate line. The liquid crystal capacitor has a difference voltage of the picture signal supplied to the pixel electrode and a reference common voltage supplied to the common electrode charged thereto for varying orientation of the liquid crystal molecules according to the difference voltage to control a light transmissivity to form a gray scale.

The liquid crystal display panel 2 may be divided into a plurality of regions depending on a size thereof, such as, as shown in FIG. 1, first and second regions according to a number of the source printed circuit boards 8a and 8b, i.e., first and second source printed circuit boards 8a and 8b, or a plurality of regions in correspondence to a number of data integrated circuits 4a and 4b.

The drive unit which drives the liquid crystal display panel 2 has a gate driver for driving the gate lines of the liquid crystal display panel 2, and a data driver for driving the data lines of the liquid crystal display panel 2.

The data driver includes a plurality of data integrated circuits 4a and 4b and data circuit films 6a and 6b, and at least one source printed circuit board 8a and 8b. The plurality of data integrated circuits 4a and 4b are positioned between one side of the liquid crystal display panel 2 and at least one of the source printed circuit boards 8a and 8b for driving the data lines of the liquid crystal display panel 2. The plurality of data integrated circuits 4a and 4b are mounted to the data circuit films 6a and 6b respectively and connected to the liquid crystal display panel 2 and between the source printed circuit boards 8a and 8b.

The gate driver includes a plurality of gate integrated circuits 3 provided to another side of the liquid crystal display panel 2, for driving gate lines provided to at least one picture display region. The plurality of the gate integrated circuits 3 are respectively mounted to the gate circuit films 5 and connected to the liquid crystal display panel 2.

TCP (Tape Carrier Package) films or COF films may be used as the gate and the data circuit films 5, 6a, and 6b. Especially, the data integrated circuit films 6a and 6b are attached between the source printed circuit boards 8a and 8b and the liquid crystal display panel 2 by TAB (Tape Automated Bonding), respectively. The plurality of data integrated circuits 4a and 4b are electrically connected to the drive control unit 10 via the data circuit films 6a and 6b respectively and one of the source printed circuit boards 8a and 8b, and gate integrated circuits 3 are electrically connected to the drive control unit 10 via the gate circuit film 5, the liquid crystal display panel 2, the data circuit film 6a and 6b, and the source printed circuit boards 8a and 8b. In this instance, numbers of the gate and data integrated circuits 3, 4a and 4b are not limited to numbers shown in FIGS. 1 and 2.

The plurality of data integrated circuits 4a and 4b in the data driver supply analog picture signals to the data lines by using data control signals from the drive control unit 10, such as a source start pulse SSP, a source shift clock SSC, a source output enable SOE signal. In other words, each of the data integrated circuits 4a and 4b latches the analog picture signal received in response to the SSC, and forwards to each horizontal line in response to the SOE signal received through the drive control unit 10. And, each of the data integrated circuits 4a and 4b converts and forwards the picture data of each horizontal line into an analog picture voltage, i.e., a picture signal.

The gate integrated circuits 3 in the gate drive units supply scan pulses or gate low voltages to the gate lines by using gate control signals from then drive control unit 10, such as a gate start pulse GSP, a gate shift clock GSC, and a gate output enable GOE signal. In other words, each of the gate integrated circuits 3 shifts the GSP from the drive control unit 10 in response to the GSC to supply a scan pulse of a gate high voltage to the gate lines in succession, and supplies a gate low voltage to the gate lines in a period no scan pulse is supplied to the gate lines.

The drive control unit 10 which controls the plurality of gate and data integrated circuits 3, 4a and 4b includes a timing controller 18 for controlling the plurality of gate and data integrated circuits 3, 4a and 4b by using the picture data and a plurality of synchronizing signals from a system which is not shown. The drive control unit 10 may be provided to a separate control printed circuit board having at least one control connector 14a and 14b attached thereto for supplying the control signals to the liquid crystal module from the drive control unit 10 through the cables 16a and 16b.

In more detail, referring to FIGS. 1 and 2, in a case the drive control unit 10 is formed at the control printed circuit board, the drive control unit 10 also supplies the control signals to the first and second source connectors 12a and 12b formed at the source printed circuit boards 8a and 8b of the drive unit through the first and second control connectors 14a and 14b and the first and second cables 16a and 16b, respectively. The control signals supplied to the first and second source connectors 12a and 12b are supplied to the data integrated circuits 4a and 4b through the sub-printed circuit boards 8a and 8b and the data circuit films 6a and 6b, respectively.

In the meantime, the gate integrated circuits 3 have control signals required therefore supplied thereto through the first and second control connectors 14a and 14b, the first and second cables 16a and 16b, the first and second source connectors 12a and 12b, at least one sub-printed circuit board 8a and 8b and the data circuit film 6a and 6b, the liquid crystal display panel 2 and the gate circuit film 5. The first and second cables 16a and 16b may be flexible printed circuits, flexible flat cables, or anisotropic conductive films.

Figure 3:
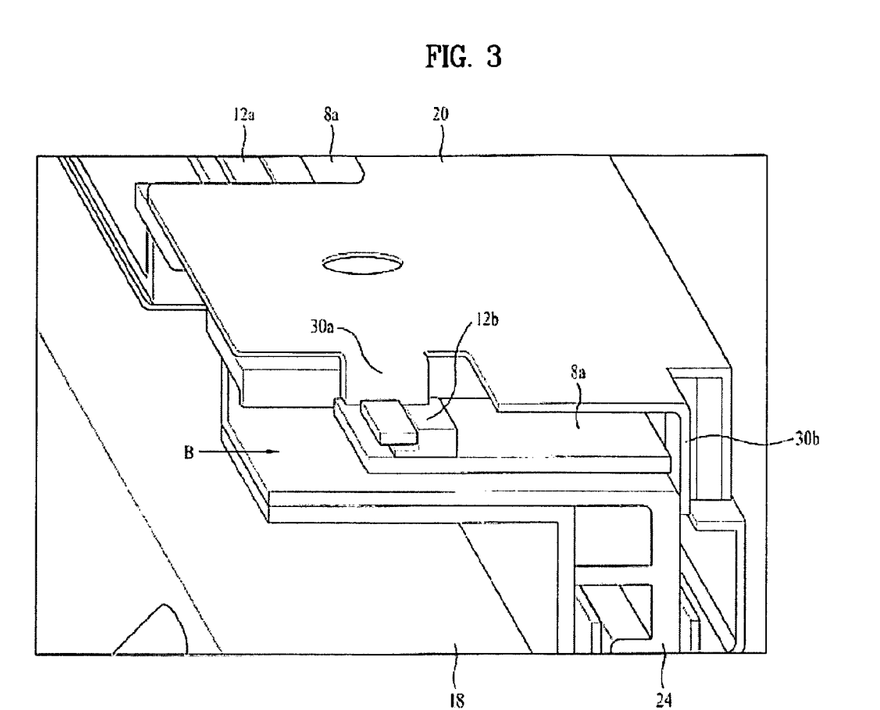
FIG. 3 illustrates a section showing detail of part A in FIG. 2 having at least one cable or a connector to be connected to a liquid crystal module.

FIG. 3 illustrates a section showing detail of an A part in FIG. 2 having at least one cable or a connector to be connected to a liquid crystal module.

Referring to FIG. 3, there is a panel supporter 24 between the top case 20 and the bottom plate 18 for maintaining and securing a gap between the top case 20 and the bottom plate 18 and fastening the liquid crystal display panel 2 thereto. The panel supporter 24 is provided along an inner circumference of the top case 20, and the liquid crystal display panel 2, seated on an inner side of a front of the panel supporter 24, is secured between the panel supporter 24 and the top case 20. According to this, the data circuit films 6a and 6b attached to one side of the liquid crystal display panel 2 are positioned at an inner side of the top case 20 along one side surface of the panel supporter 24, and the sub-printed circuit boards 8a and 8b respectively attached to the data circuit films 6a and 6b are positioned between one side of the panel supporter 24 or the bottom plate 18 and the top case 20. In the case of FIG. 3, the sub-printed circuit boards 8a and 8b are positioned between the one side of the panel supporter 24 and the top case 20, and the bottom plate 18 surrounds a back side of the panel supporter 24.

In the meantime, referring to FIG. 3, the sub-printed circuit boards 8a and 8b have at least one of the first and second source connectors 12a and 12b attached thereto respectively, and the first and second source connectors 12a and 12b have at least one cable 16a or 16b or connector which is connected to the drive control unit 10 inserted therein in a direction of an arrow "B".

The top case 20 has at least one first and second fastening bent portions 30a and 30b formed for fastening the source printed circuit boards 8a and 8b having the source connectors 12a and 12b attached thereto respectively. The first and second fastening bent portions 30a and 30b fasten the source printed circuit boards 8a and 8b having the source connectors 12a and 12b attached thereto respectively in vertical and horizontal directions such that the source printed circuit boards 8a and 8b do not move for making easy insertion of the cables 16a and 16b or the connectors from the drive control unit 10 to the source connectors 12a and 12b.

In more detail, at least one first fastening bent portion 30a is vertically projected inward from the top case 20 such that the first fastening bent portion 30a is also vertical to the source printed circuit boards 8a and 8b at a position opposite to the source printed circuit boards 8a and 8b having the source connectors 12a and 12b attached thereto, respectively. Accordingly, the at least one first fastening bent portion 30a fastens the source printed circuit boards 8a and 8b such that the source printed circuit boards 8a and 8b can not move in a vertical direction so that the source printed circuit boards 8a and 8b are secured between the first fastening bent portion 30 and the panel supporter 24 or the bottom plate 18. In other words, the source printed circuit boards 8a and 8b is secured between the first fastening bent portion 30a and the panel supporter 24 or the bottom plate 18 such that the source printed circuit boards 8a and 8b can not move in the vertical direction.

In the meantime, the second fastening bent portion 30b is projected inward from bent portions of the top case 20, i.e., front and side direction bent portions in a direction opposite to front and side bent directions, such that the second fastening bent portion 30b is projected at a position opposite to the source printed circuit boards 8a and 8b having the source connectors 12a and 12b attached thereto in a horizontal direction. Accordingly, the at least one second fastening bent portion 30b secures the source printed circuit boards 8a and 8b such that the source printed circuit boards 8a and 8b can not move in a horizontal direction. That is, the source printed circuit boards 8a and 8b are secured by the second fastening bent portions 30b bent and projected in a horizontal direction and the data circuit films 6a and 6b attached to the source printed circuit boards 8a and 8b themselves respectively such that the source printed circuit boards 8a and 8b can not move in the horizontal direction.

Thus, the source printed circuit boards 8a and 8b are secured unable to move in the vertical and horizontal directions by at least one of the first and second fastening bent portions 30a and 30b respectively for making easy insertion of the cables 16a and 16b or the connectors from the drive control unit 10 into the source connectors 12a and 12b, respectively.

Figure 4:
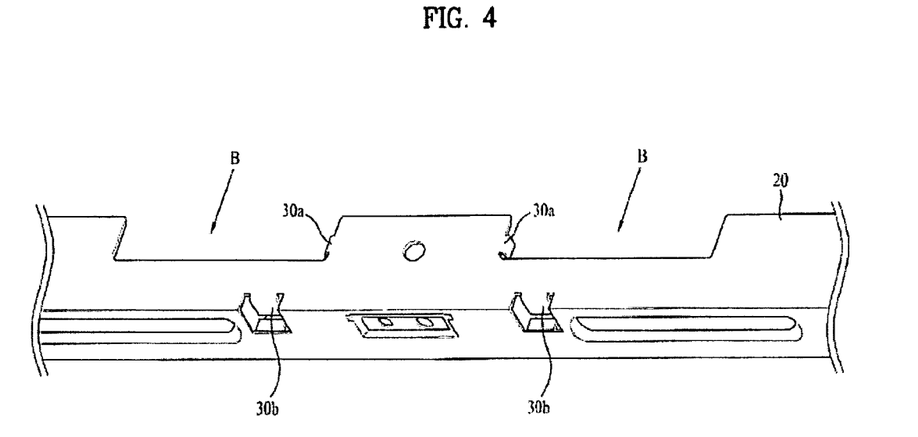
FIG. 4 illustrates a plan view showing part A of a top case in FIG. 2 in more detail.
Figure 5:
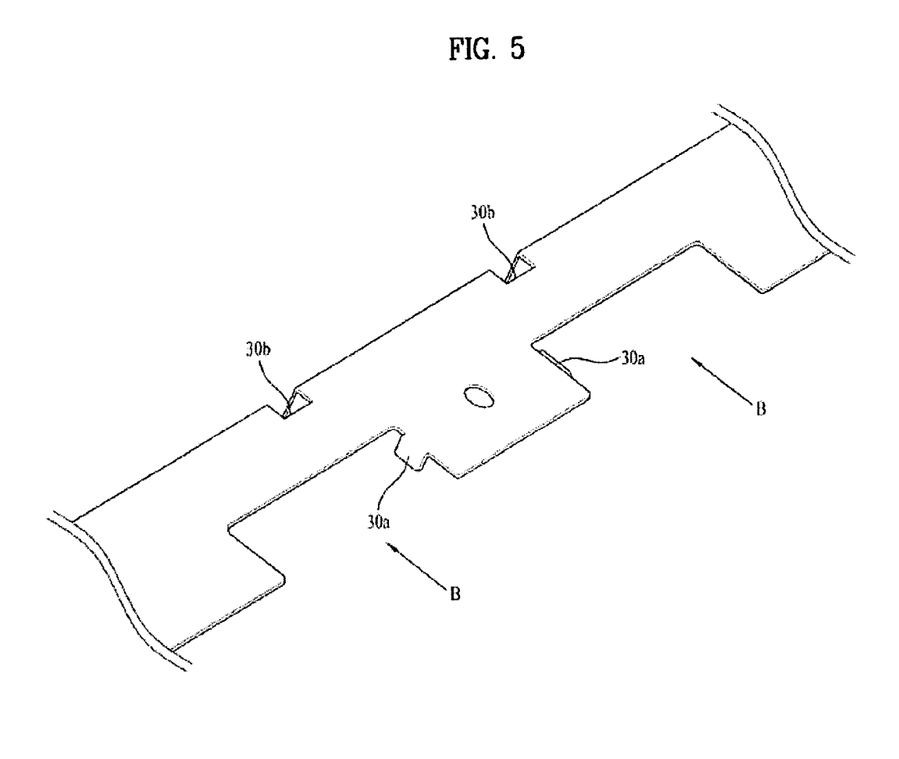
FIG. 5 illustrates a plan view of the top case in FIG. 4 seen from another direction.

FIG. 4 illustrates a plan view showing an A part of a top case in FIG. 2 in more detail, and FIG. 5 illustrates a plan view of the top case in FIG. 4 seen in another direction.

Referring to FIGS. 4 and 5, the top case 20 has bent portions to cover a front circumference and left/right and upper/lower sides of the liquid crystal module.

As described before, the top case 20 has at least one first and second fastening bent portions 30a and 30b for prevent the source printed circuit boards 8a and 8b in the top case 20 from moving, wherein formed in regions opposite to the source connectors 12a and 12b of the source printed circuit boards 8a and 8b, there are opened region 40a and 40b, additionally.

The opened regions 40a and 40b, formed to make easy insertion of the cables or connectors from the drive control unit 10 to the source connectors 12a and 12b of the source printed circuit boards 8a and 8b, expose the source connectors 12a and 12b of the source printed circuit boards 8a and 8b so that the cables or connectors from the drive control unit 10 can be inserted into the source connectors 12a and 12b of the source printed circuit boards 8a and 8b, more easily. For this, it is preferable that the opened regions 40a and 40b have sizes formed larger than sizes of the source connectors 12a and 12b.

Thus, if the opened regions 40a and 40b are formed, the first fastening bent portions 30a can be formed at the opened regions 40a and 40b by bending the top case 20 in a direction vertical to the source printed circuit boards 8a and 8b at positions opposite to the source printed circuit boards 8a and 8b having the source connectors 12a and 12b attached thereto, respectively. Accordingly, the opened regions 40a and 40b minimize areas to be in contact with the top case 20, thereby permitting easy insertion of the cables 16a and 16b and the connectors from the drive control unit 10 to the source connectors 12a and 12b, respectively.

As has been described, the liquid crystal display device of the present invention has the following advantages.

The change of a bending structure of the top case permits to secure the cable or connectors.

Eventually, the damage to the printed circuit boards and printed circuit films at which the connectors are formed as well as the cables or the connectors can be prevented, and the cables and the connectors can be connected easily, thereby permitting to improve assembly process efficiency of the liquid crystal display device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a liquid crystal module having:
   a top case which forms a front side exterior of the liquid crystal module,
   a bottom plate which forms a back side exterior of the liquid crystal module,
   a liquid crystal display panel in the top case and the bottom plate for displaying a picture; and
   a drive unit for driving gate lines and data lines in the liquid crystal display panel; and
   a drive control unit for generating a control signal for controlling the drive unit of the liquid crystal module and supplying the control signal to the drive unit of the liquid crystal module through at least one control connector and one cable,
   wherein the top case of the liquid crystal module includes at least one first and one second fastening bent portion formed for fastening at least one source printed circuit board having at least one source connector of the drive unit of the liquid crystal module attached thereto so that the at least one source printed circuit board could not move in horizontal and vertical directions, respectively,
   wherein the drive control unit is formed on a control printed circuit board provided to a back side of the bottom plate, and the cables electrically connected through the control printed circuit board and the at least one control connector are respectively connected to the source connectors at the source printed circuit boards for supplying the control signal thereto,
   wherein the at least one fastening bent portion is vertically projected inward from the top case such that the first fastening bent portion is also vertical to the source printed circuit boards at a position opposite to the source printed circuit boards having the source connectors attached thereto respectively so that the at least one first fastening bent portion fastens the source printed circuit boards such that the source printed circuit boards cannot move in a vertical direction.

2. The liquid crystal display device as claimed in claim 1, wherein the drive unit of the liquid crystal module includes a plurality of data integrated circuits, a plurality of data circuit films, and at least one source printed circuit board for driving data lines in the liquid crystal module,
   wherein the plurality of data integrated circuits are respectively mounted to the plurality of data circuit films and connected between one side of the liquid crystal display panel and the source printed circuit boards.

3. The liquid crystal display device as claimed in claim 1, wherein the source printed circuit boards are secured such that the source printed circuit boards cannot move vertically between the first fastening bent portions bent inward from the top case to be in contact thereto and a panel supporter or the bottom plate.

4. The liquid crystal display device as claimed in claim 1, wherein the at least one second fastening bent portion is projected inward from front and side direction bent portions of the top case in a direction opposite to front and side bent directions, such that the second fastening bent portion is projected at a position opposite to the source printed circuit boards in a horizontal direction.

5. The liquid crystal display device as claimed in claim 4, wherein the source printed circuit boards are secured by the second fastening bent portions bent and projected in a horizontal direction and data circuit films are attached to the source printed circuit boards respectively such that the source printed circuit boards cannot move in the horizontal direction.

6. The liquid crystal display device as claimed in claim 1, wherein the top case includes at least one opened region at each region opposite to positions of source connectors at each of the source printed circuit boards.

7. The liquid crystal display device as claimed in claim 6, wherein the size of the opened region is larger than the size of the source connector such that the opened region can expose the source connector of the source printed circuit board.

8. The liquid crystal display device as claimed in claim 6, wherein the at least one fastening bent portion is formed by bending the top case at the opened regions vertical to the source printed circuit boards.

* * * * *